United States Patent Office 2,824,786
Patented Feb. 25, 1958

2,824,786

MANUFACTURE OF KH₂PO₄

Menahem Merlub-Sobel, Jersey City, N. J., assignor to Horizons Incorporated, Princeton, N. J., a corporation of New Jersey No Drawing. Application February 20, 1956
Serial No. 566,360

7 Claims. (Cl. 23—107)

This invention relates to the production of potassium dihydrogen phosphate.

For many years, the fertilizer industry has recognized the potential advantages of a concentrated fertilizer material rich in both potassium and phosphate values. Extensive experimentation to produce either potassium dihydrogen phosphate ($KH_2PO_4$) or potassium metaphosphate ($KPO_3$) has, as yet, failed to yield a commercially attractive process. The metaphosphate contains 39.87% $K_2O$ and 60.13% $P_2O_5$ and is therefore particularly attractive as a highly concentrated (100%) plant food; the normal monopotassium phosphate ($KH_2PO_4$) is only slightly less concentrated, for it contains 34.61% $K_2O$ and 52.16% $P_2O_5$. In addition it has the desirable physical properties of being free-flowing and non-hygroscopic even at high humidities. Furthermore the compound $KH_2PO_4$ is highly soluble in marked contrast to the insoluble $KPO_3$.

Many methods have been proposed for the manufacture of the potassium phosphates, including a number based on the neutralization of phosphoric acid with potassium carbonate or potassium hydroxide or potassium chloride. Both the carbonate and hydroxide are disqualified as economically impractical. Processes based on the reaction between potassium chloride and phosphoric acid require an excess of concentrated phosphoric acid and for a substantial conversion to $KH_2PO_4$, the highly corrosive reaction mixture must be heated to temperatures on the order of 250° C. Under these conditions, the final reaction mass usually contains excess phosphoric acid which must be neutralized by potassium carbonate or potassium hydroxide to avoid contamination of the potassium phosphate product, thus adding appreciably to the cost of the process. Furthermore it appears that all the chlorine cannot be driven off from the reaction mixture without, at the same time, heating the phosphate to such a point that substantially all of it is completely dehydrated to produce the metaphosphate ($KPO_3$), which, because of its insolubility is less desirable for many fertilizer purposes.

Because of the economic and technical difficulties present in processes involving interaction of phosphoric acid with KOH, $K_2CO_3$ or KCl, others in the field have developed processes in which mixtures or complex compounds such as $KH_2PO_4.H_3PO_4$ are involved. Still others have endeavored to react KCl with $NH_4H_2PO_4$. Instead of producing a pure phosphate of potassium, the product in this case is inevitably a mixture of potassium and ammonium compounds because of the fact that $NH_4H_2PO_4$ and $KH_2PO_4$ form a continuous series of mixed crystals.

This disadvantage does not exist in the case of the interaction of monosodium phosphate and potassium chloride. This was recognized by Klingbeil who, in German Patent 222,913, proposed the addition of KCl to a solution of $NaH_2PO_4$, boiling down the solution until a condition of saturation with respect to NaCl is obtained and then cooling to effect crystallization of a substantial portion of the $KH_2PO_4$ present. The patentee then proposed to reheat the liquid remaining after separation of the $KH_2PO_4$ to boil away an additional amount of water, thereby crystallizing out part of the sodium chloride. Evaporation is continued until the saturation point for potassium phosphate at the boiling point is reached. Thereafter the solution is cooled to recover part of the potassium phosphate, which crystallizes out on cooling. Repetition of the steps of heating, boiling off some of the water, crystallization of sodium chloride, cooling and crystallization of potassium dihydrogen phosphate, according to the patentee, carried the process to completion. The process has not achieved commercial success, even in Germany, because of the many expensive heatings and coolings, the corrosiveness of the solutions, and the latent possibility that during the crystallization of the sodium chloride some potassium phosphate would also be thrown out of solution. Another such process is disclosed in French Patent 706,548. The above disadvantages and various other limitations in prior art processes based on the reaction: $NaH_2PO_4+KCl=KH_2PO_4+NaCl$ are avoided by the practice of my invention.

In accordance with the process I have developed, the yield of $KH_2PO_4$ by means of the above reaction is substantially increased above the 71% normally obtainable by merely cooling a reaction mixture which is saturated with respect to $KH_2PO_4$ at 100° C., the cooling being from 100° C. down to room temperature. In my preferred method, an appropriate water-miscible organic solvent having a boiling point below 100° C. is added to the reaction mixture, the proportion of organic solvent being chosen so that substantially all of the sodium chloride formed by the reaction remains in solution in the mixed (water+organic solvent) mother liquor, while the solubility of the potassium dihydrogen phosphate is significantly decreased. I have found that the solubility of NaCl in the mixed water-organic solvent system is not materially affected by the presence of potassium and phosphate ions; on the other hand, the solubility of $KH_2PO_4$ is substantially decreased in the presence of a saturated solution of NaCl.

The principle upon which my process depends may better be understood from the following data, obtained in a study of the solubility of $KH_2PO_4$ in a mixed water-methanol solvent substantially saturated as regards dissolved NaCl. The solution was prepared by dissolving 829 parts by weight of U. S. P. monosodium phosphate monohydrate in 100 cc. of water after heating the water to near its boiling point; to this hot solution 488 parts by weight of potassium chloride were added, with vigorous stirring, until complete solution was effected. When the solution was cooled to 20° C., considerable $KH_2PO_4$ was precipitated. The mother liquor, after filtering off the solid $KH_2PO_4$, was found to contain the equivalent of 170 grams/liter of residual dissolved $KH_2PO_4$. Diluting this solution with methanol lowers the solubility of $KH_2PO_4$, as shown in the table below.

| Methanol Added, Percent by Volume | Concentration of Methanol by Volume, Percent | $KH_2PO_4$ Solubility, Grams/Liter |
|---|---|---|
| 0 | 0 | 170 |
| 5 | 4.8 | 139 |
| 10 | 9.1 | 107 |
| 20 | 16.7 | 72 |
| 40 | 28.5 | 37 |
| 100 | 50.0 | 12 |

On the other hand, the solubility of sodium chloride remains significantly high even with increasing proportions of methanol in a water-methanol solvent. Published data for the system $H_2O$—$CH_3OH$—$NaCl$ indicate the following:

| Methanol Concentration by Volume, Percent | NaCl Solubility, Grams/Liter |
|---|---|
| 0 | 360 |
| 12.3 | 297 |
| 23.9 | 242 |
| 35.1 | 193 |
| 45.7 | 150 |
| 55.8 | 111 |

It will be noted, by interpolation, that a 50%–50% (by volume) solvent will hold about 130 grams of NaCl in solution; more than ten times as much as $KH_2PO_4$ in the same solvent when saturated with NaCl.

With the above data in mind, my preferred practice is to dissolve monosodium phosphate and potassium chloride in a quantity of hot water such that the resulting sodium chloride will remain in solution even after the addition of an appropriate amount of methanol or other organic solvent at some later stage of the process. The solution is achieved at a temperature sufficiently high for complete solubilization of both the monosodium phosphate and the potassium chloride. Thereafter the solution is cooled to a temperature well below the boiling point of the particular organic solvent to be added, and then adding the proper amount of organic solvent. The resulting solution is then cooled to as low a temperature as is considered economically justified. As a result, potassium dihydrogen phosphate crystallizes out and is separated by filtration. The crystals are washed free of mother liquor with fresh water-solvent mixture or pure solvent and after drying are ready for marketing.

The following examples will further illustrate the practice of my invention.

*Example I*

Eight hundred fifty (850) parts by weight of water were heated to about 80° C. and three hundred sixty (360) parts by weight of anhydrous monosodium dihydrogen phosphate ($NaH_2PO_4$) were dissolved therein. Two hundred twenty four (224) parts by weight of potassium chloride (KCl) were then dissolved in the solution of the phosphate. The amount of water present was about 1.7 times that required for complete solution of the salts in water and represents the amount required to maintain solution in the organic-water solvent at a later stage.

The solution was cooled to about 50° C. and eight hundred fifty parts by weight of methanol was added to it, with stirring. On further cooling to room temperature (20° C.) fine crystals of monopotassium phosphate ($KH_2PO_2$) were seen to form. The stirring was discontinued and the slurry of crystals and mother liquor was filtered. The separated crystals were washed with a water-methanol wash (1:1 by weight) and then dried at 110° C. A yield of of 372.0 parts of $KH_2PO_4$ was obtained, with a chloride impurity content of only 0.38%, which could have been further diminished by additional washing. This corresponded to a yield of 91.09% $KH_2PO_4$. Another 7.96% of the $KH_2PO_4$ remained in the mother liquor and handling losses approximated 0.95%.

*Example II*

The procedure of Example I was repeated except that a more dilute solution of the salts was employed, with 1000 parts by weight of water instead of 850 and with 2000 parts by weight of methanol instead of 850 parts. With these changes, the yield of $KH_2PO_4$ was increased to 96.14% with only a trace (0.02%) of chloride impurity and only 3.14% of the potassium phosphate remaining in the mother liquor. Handling or mechanical losses amounted to a total of 0.71% in this experiment.

*Example III*

This procedure of Example I was repeated except that the solution was ultimately cooled to 5° C. and the yield was increased to between 95 and 96%.

*Example IV*

One of the less obvious advantages of my process is that a relatively dilute phosphoric acid can be used to form the solution of monosodium phosphate ($NaH_2PO_4$) which would otherwise be produced by reactions in which expensive concentrated phosphoric acid would be employed. A solution $NaH_2PO_4$ was formed by reacting 159 parts by weight of soda ash ($Na_2CO_3$) with 1144 parts by weight of dilute $H_3PO_4$ (25.7% acid). The solution was heated to 80° C. and 224 parts by weight of KCl were added, with stirring to effect complete solution of all the salts present. Thereafter the solution was cooled to a temperature of 50° C. and 850 parts by weight of methanol were added. Upon further cooling to 20° C., a yield of 91.5% of $KH_2PO_4$ was obtained with a chlorine impurity of 0.38%. Since phosphoric acid in concentrations up to 30% may be prepared easily and cheaply, while the higher concentrations are considerably more expensive, the feasibility of using such low concentrations of phosphoric acid, without concentrating the acid to higher strength and also without intermediate manufacture of monosodium phosphate ($NaH_2PO_4$) in crystalline form, is of great advantage.

For most commercial purposes, such yields would be adequate. In such instances the mother liquor after separation of the $KH_2PO_4$ therefrom by filtration, preferably in a centrifugal extractor, is distilled to recover the methanol or other organic solvent, leaving behind as a residue from the distillation, a liquid rich in sodium chloride which can be discarded. However, the mother liquor does contain small amounts of potassium and phosphate, the recovery of which may be desired and, since under the conditions prevailing during distillation, the mother liquor is extremely corrosive, I have devised a recovery procedure for recovering the phosphate in which corrosion is minimized or entirely avoided. I accomplish this by neutralizing the mother liquor with sodium carbonate and/or sodium hydroxide. A sufficient amount of the alkali is used to form either the dibasic or tribasic phosphate, $Na_2HPO_4$ or $Na_3PO_4$. Relatively little alkali is required because of the low phosphate content in the mother liquor. Since both of these salts are almost completely insoluble in the water-methanol liquor, substantially all of the phosphate is thereby recovered.

The following example illustrate this facet of my invention.

*Example V*

To the mother liquor of Example I, after the addition of the liquid obtained by washing the $KH_2PO_4$, there was added 40 parts by weight of caustic soda. As a result 79.3 parts by weight (weighed after drying at 110° C.) of trisodium phosphate (39.4% $P_2O_5$) precipitated from the solution and was separated by centrifuging the reaction liquid. The separated liquid was sent to a distillation tower where the methanol and water were separated in the usual manner. The recovered methanol was returned for reuse in a repetition of the process. Recovery of the methanol and of the phosphate were substantially quantitative.

While in the foregoing examples methanol has been indicated as the organic solvent, it should be noted that other solvents may be employed. I have found that both the alcohols and water-miscible ketones having boiling points below 100° C. may be used to advantage since all of them have been found to be better solvents for sodium chloride than for potassium phosphate (relatively speaking) and hence are effective in facilitating the precipitation of the potassium phosphate. Since, however, the higher alcohols and ketones, particularly at higher solvent concentrations, tend to form two phases, and are thus much less effective, I prefer to employ either methanol or ethanol as the organic solvent used in my process.

I claim:

1. A process for producing potassium dihydrogen phosphate which comprises: forming a water solution at a relatively high temperature from potassium chloride and sodium dihydrogen phosphate, cooling the solution to below the boiling point of an organic liquid to be added thereto, adding an organic liquid to the solution from the group consisting of alcohols and ketones boiling below 100° C., cooling the resulting product to precipitate the potassium dihydrogen phosphate formed by interaction of the ingredients in the solution, and separating and recovering the crystals from the remaining liquor.

2. A process for producing potassium dihydrogen phosphate which comprises: forming a water solution from potassium chloride and sodium dihydrogen phosphate, heating the solution to a relatively high temperature, cooling the solution to below the boiling point of an organic solvent to be added thereto, adding a water-miscible organic liquid to the solution from the group consisting of water-miscible alcohols and water-miscible ketones boiling below 100° C., cooling the resulting product to precipitate the potassium dihydrogen phosphate formed by interaction of the ingredients in the solution, and separating and recovering the crystals from the remaining liquor.

3. A process for producing potassium dihydrogen phosphate which comprises: forming a water solution at a relatively high temperature and containing potassium chloride and sodium dihydrogen phosphate, cooling the solution to below the boiling point of an organic solvent to be added, adding a water-miscible organic solvent consisting of at least one alcohol boiling below 100° C. to the solution, cooling the resulting product to precipitate the potassium dihydrogen phosphate formed by interaction of the ingredients in the solution, and separating and recovering the crystals from the remaining liquor.

4. A process for producing potassium dihydrogen phosphate which comprises: forming a hot aqueous solution of potassium chloride and sodium dihydrogen phosphate, cooling the solution to below the boiling point of methyl alcohol, adding methyl alcohol to the solution, further cooling the resulting product to precipitate the potassium dihydrogen phosphate formed by interaction of the ingredients in the solution, and separating and recovering the crystals from the remaining liquor.

5. A process for producing potassium dihydrogen phosphate which comprises: forming a hot aqueous solution containing potassium chloride and sodium dihydrogen phosphate, cooling the solution to below about 60° C., adding a water-miscible organic solvent to the solution from the group consisting of alcohols and ketones boiling below 100° C., up to an amount sufficient to retain in solution all of the sodium chloride formed as a result of the interaction of the potassium chloride and sodium dihydrogen phosphate, cooling the resulting product to precipitate the potassium dihydrogen phosphate formed by interaction of the ingredients in the solution, and separating and recovering the crystals from the remaining liquor.

6. A process for producing potassium dihydrogen phosphate which comprises: forming a hot aqueous solution containing potassium chloride and sodium dihydrogen phosphate at a relatively high temperature; cooling the solution to below 60° C.; adding methanol to the solution, the amount of methanol being no more than that sufficient to retain in solution any sodium chloride formed by interaction of the ingredients in the solution; further cooling the resulting product to precipitate the potassium dihydrogen phosphate formed by interaction of the ingredients in the solution; and separating and recovering the crystals of $KH_2PO_4$ from the remaining liquor.

7. A process for producing phosphates which comprises: forming a hot aqueous solution containing potassium chloride and sodium dihydrogen phosphate, cooling the solution to below the boiling point of an organic liquid to be added, adding an organic liquid from the group consisting of alcohols and ketones boiling below 100° C., cooling the resulting product to precipitate the potassium dihydrogen phosphate formed by interaction of the ingredients in the solution, separating and recovering the crystals of $KH_2PO_4$ from the remaining liquor, adding at least one alkali from the group consisting of soda ash and caustic soda and mixtures thereof to the remaining liquor to form an insoluble sodium phosphate therein, by reaction with the phosphate in said solution, not recovered as $KH_2PO_4$, and separating and recovering the insoluble sodium phosphate from said solution.

No references cited.